United States Patent [19]

Willyoung

[11] 3,894,253

[45] July 8, 1975

[54] VERY HIGH CURRENT FIELD WINDING FOR DYNAMOELECTRIC MACHINE ROTOR

[75] Inventor: David M. Willyoung, Scotia, N.Y.

[73] Assignee: General Electric Company, Schenectady, N.Y.

[22] Filed: Oct. 25, 1973

[21] Appl. No.: 409,651

[52] U.S. Cl. ................................................ 310/61
[51] Int. Cl.² ........................................ H02K 1/32
[58] Field of Search ............ 310/52, 53, 54, 55, 58, 310/59, 60, 61, 51, 64, 65, 179, 185, 187, 201, 192, 208, 194, 195, 214–218, 211, 269, 261, 264; 73/118

[56] References Cited
UNITED STATES PATENTS

| | | | |
|---|---|---|---|
| 1,808,749 | 6/1931 | Apple | 310/201 |
| 2,527,878 | 10/1950 | Fechheimer | 310/54 |
| 3,131,321 | 4/1964 | Gibbs | 310/54 |
| 3,145,314 | 8/1964 | Becker | 310/61 |
| 3,150,280 | 9/1964 | Little | 310/215 |
| 3,151,479 | 10/1964 | Willyoung | 73/118 |
| 3,349,264 | 10/1967 | Willyoung | 310/185 |
| 3,359,438 | 12/1967 | Hylen | 310/52 |
| 3,408,516 | 1/1968 | Kudlacik | 310/195 |
| 3,562,569 | 2/1971 | Koechlin | 310/211 |
| 3,639,794 | 2/1972 | Karpman | 310/261 |
| 3,733,501 | 5/1973 | Heller | 310/54 |
| 3,740,595 | 6/1973 | Heller | 310/64 |

Primary Examiner—R. Skudy
Attorney, Agent, or Firm—John F. Ahern; James W. Mitchell

[57] ABSTRACT

An arrangement for a dynamoelectric machine rotor with a very high current winding employing only one or two conductors per slot. The slot windings are held by insulated dovetails and extend to the rotor surface to be cooled by convection. Excitation current from the connection bars in the rotor bore hole is fed through a plurality of radial studs to the outer coils of the concentrically wound field winding. Connection between the opposite pole windings is made by a fluid-cooled connection between the inner coil terminating conductors.

6 Claims, 8 Drawing Figures

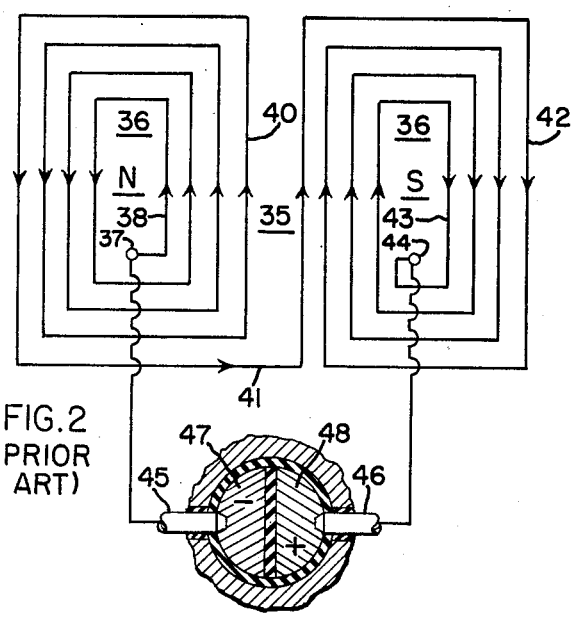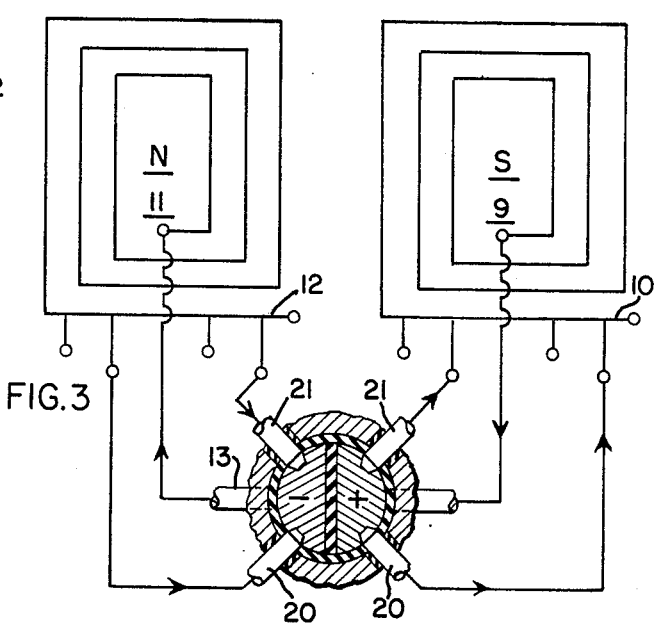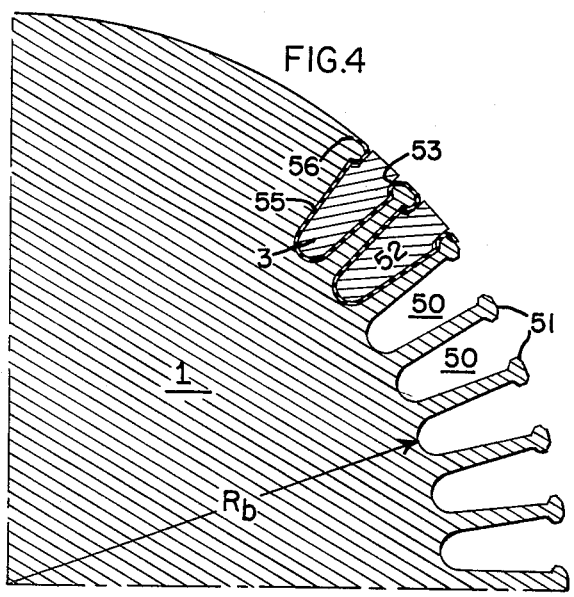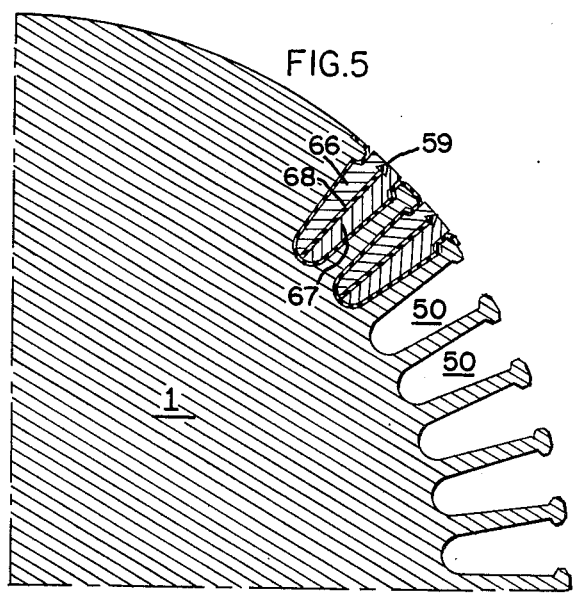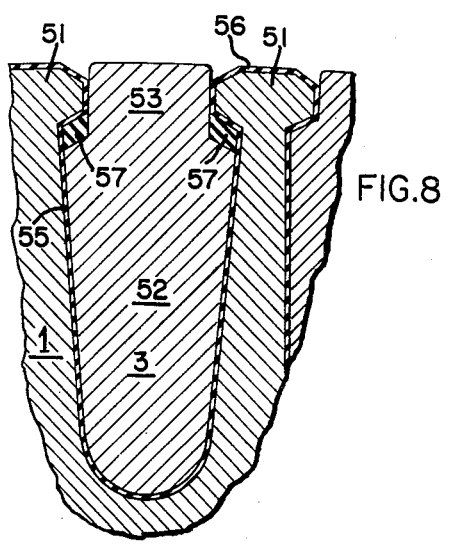

VERY HIGH CURRENT FIELD WINDING FOR DYNAMOELECTRIC MACHINE ROTOR

BACKGROUND OF THE INVENTION

Very large dynamoelectric machines such as steam turbine generators have been continually improved to secure higher output and have been built with ratings exceeding 1200 MVA. One of the ways in which such dynamoelectric machines have been uprated is by increasing the ampere-turns produced by the rotor field winding. This has usually been accomplished by increasing current densities in the field conductors and employing highly effective fluids and cooling systems, such as direct hydrogen cooling, for the conductors to enable them to carry the higher currents. Another method is to increase the total effective area of field winding conductors in the rotor cross section to reduce the total ohmic losses but since the rotor diameter is limited by centrifugal stress considerations, more copper tends to require deeper slots and deeper slots serve to reduce the cross-sectional area of the steel rotor body itself. Since the rotor body must provide a path for the main generator flux which is directly proportional to the generator power capacity, any constriction of this region will reduce the output of the dynamoelectric machine.

Prior art rotors for large turbine generators have generally utilized windings retained in slots in the magnetic rotor forging by slot-closing wedges of steel or aluminum supported on each side by circumferentially extending lips interlocking with axial lips (dovetails) formed in the sides of said rotor slots near their outer radius. These wedges and the insulation system to separate the electrically energized winding from them occupy a substantial radial depth and an area which may be 30% or more of the winding area within the slot.

If constructions are provided to increase generator output by enabling the field windings to produce more ampere-turns without reducing magnetic flux carrying capability of the rotor, it is further necessary to carry excitation current via connection bars in the rotor spindle by means of intermediate conductors to the terminal ends or terminating conductors of the field winding. The current carrying capacity of such intermediate conducting members must be commensurate with that of the field winding itself.

A conventional construction for carrying excitation current from connection bars in the bore hole is by means of radial terminal studs through the rotor spindle which are led to the inner ends of series-connected coils wound concentrically around each rotor pole. The connection between opposite pole windings is then made by joining the ends terminal of the outer coils. The space required to make the terminal stud connections is limited and imposes great problems for a very high current rotor using conventional techniques. These problems are aggrevated by the need to provide effective hydrogen seals between the studs and the rotor to prevent leakage of hydrogen into the bore hole and out the ends of the shaft.

Accordingly, one object of the present invention is to provide a rotor suitable for very large output generators by means of an improved rotor and field winding arrangement for carrying very high current and very high generator flux.

Another object is to provide an improved slot and conductor retaining arrangement for a very high current rotor having only one or two conductors per slot.

Another object of the invention is to provide an improved winding pattern and connection arrangement for a very high current rotor.

Still another object of the invention is to provide an improved arrangement for a very high current rotor field winding which permits simple construction and effective cooling of all parts including the terminal studs, winding conductors, bore hole conductors and other members.

SUMMARY OF THE INVENTION

Briefly stated, the invention is practiced by providing a field winding with only one or two conductors per slot, the coils being connected in reverse order with a gas cooled connection between inner coil terminations and with a plurality of connections leading to the outer coil terminating conductors of the field winding from the rotor bore hole. The slot-lying conductors are held in the slots by insulated dovetails, permitting the total copper area per pole side to be increased without deepening the rotor slots and provisions are made to cool all of the aforesaid conductors.

DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

FIG. 1 is an elevation drawing in cross section of one end of a dynamoelectric machine rotor in the end turn region, FIGS. 2 and 3 are schematic diagrams of field winding patterns carried out according to the prior art and the present invention, respectively, FIGS. 4 and 5 are transverse quarter sections taken through the rotor body showing arrangements with one and two conductors per slot substantially flush with the magnetic surface of the rotor, FIGS. 6 and 7 are quarter sections showing alternate arrangements for holding conductors which extend substantially above the magnetic surface of the rotor, and FIG. 8 is an expanded view of a slot cross section of FIG. 4.

DESCRIPTION OF THE PREFERRED EMBODIMENT

Figure 1:
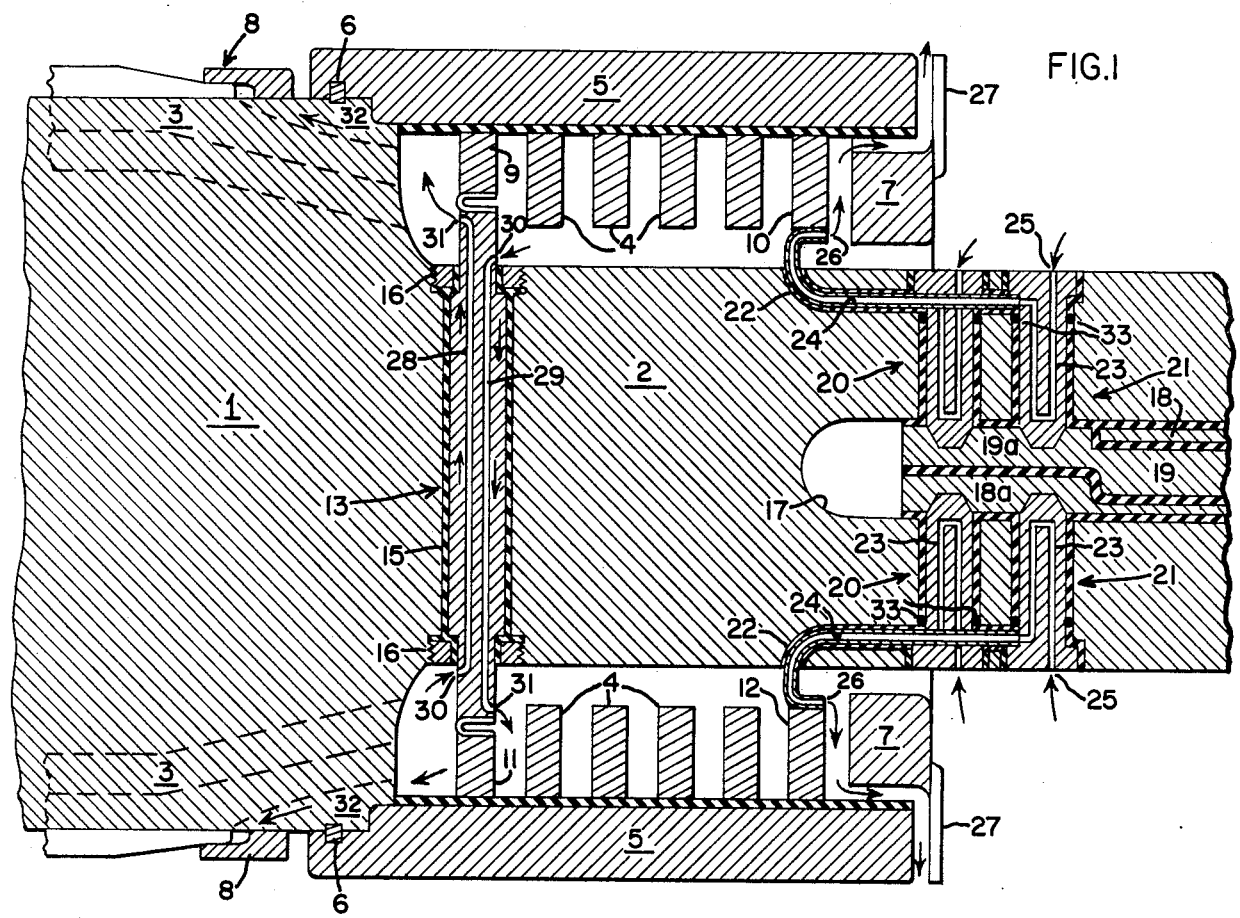

Referring now to FIG. 1 of the drawing, the end of the rotor body portion is shown at 1 and a portion of the rotor spindle at 2. Field winding conductors 3 (one per slot) bend and run in a circumferential direction to form the end turns 4. The end turns 4 are held in place by a cylindrical "retaining ring" 5 attached to the rotor body by a locking member at 6 and the outer end of retaining ring 5 is mounted on a "centering ring" 7. The transition from the slot-lying conductors 3 to end turns 4 may be made by depressing conductors 3 radially inward in deepened slots and employing an additional ring 8, a suitable construction being indicated in U.S. Pat. No. 3,395,299 to R. Quay and D. Willyoung on July 30, 1968 and assigned to the present assignee.

The winding for each pole is made by connecting conductors 3, 4 to form consecutive coils commencing with a terminating conductor 9 on the inner coil and ending with terminating conductor 10 on the outer coil. Similarly, on the diametrically opposed other pole, the coils are wound from an inner coil terminating conductor 11 to an outer coil terminating conductor 12.

A pole-to-pole connector 13 is electrically connected between inner coil terminating conductors 9, 11. In the preferred embodiment, pole-to-pole connector 13 is a diametral stud member extending through the center of the rotor spindle 2 and insulated therefrom by means of a tube of insulation 15. It is retained at either end by means of nuts 16 threaded into suitable recesses.

Alternatively to the use of a diametral stud through the spindle, a ring member insulated from the spindle can be employed to carry current between inner coil terminating conductors 9, 11 on appropriate poles.

The rotor spindle 2 is provided with an axial bore hole 17 within which are fed the connection bars carrying a high excitation current, for example, from an acyclic generator or from a conventional source through collector rings suitable for carrying very high current, such as cooled brush-type collectors or liquid metal collectors. Through most of the bore hole 17 the connection bars are coaxial cylindrical members comprising an outer conductive tube 18 and an inner rod 19 insulated from tube 18. At the terminating ends, coaxial members 18, 19 are formed into two half-round sectors 18a, 19a.

A number of radially directed terminal studs 20 are circumferentially spaced around the rotor spindle 2 and are electrically connected to the appropriate ends 18a, 19a of the connection bars. The number of radial studs may be increased by employing a second axially offset ring of studs 21. In this manner, by both axially and circumferentially spacing the studs, 10 or 12 studs may be provided for a two-pole rotor in order to lower the current density in each stud.

Each terminal stud is provided with a lead 22 connect it to one or the other of the outer coil terminating conductors 10, 12. Since terminating conductors 10, 12 extend around most of the circumference of the rotor, ample space is provided for these connections.

Cooling Provisions

In view of the very high currents carried by the foregoing members, there are provisions for fluid cooling the conductors and other connecting members by means of the hydrogen gas coolant normally based in a large dynamoelectric machine. Each of the studs 20, 21 has internal cooling passages 23 communicating with similar passages 24 in leads 22. Inlet holes 25 to the passages 23 are near the rotor spindle diameter. Outlet holes 26 from passages 24 are located at a greater diameter. Since the rotor rotates at a very high speed, the different distance from the axis of holes 25, 26 will act to pump cooling gas from inlet 25 to outlet 26. To further increase the pressure difference, centrifugal blades 27 attached to the centering ring 7 aid the pumping action.

Cooling of the diametral connector 13 is provided in similar fashion. Parallel cooling passages 28, 29 are provided through most of the length of the conductor. Each of the passages 28, 29 has an inlet 30 near the spindle and an outlet 31 at a greater diameter. Thus a counterflow of cooling gas is pumped through the connector. The gas exits at suitable cutout passages 32 under the end of retaining ring 5, providing additional cooling of the field conductors.

It remains to note that connection bars 18, 19 in the bore hole 17 must also be cooled. This may be done by using liquid coolants fed from the end of the shaft (not shown).

Hydrogen Seals

Hydrogen seal members 33 are located on each radial terminal stud 20 and 21. Since the coolant passages 23 in these studs and in the bore hole connection bars 18, 19 are self-contained within their respective conductors, hydrogen is excluded from the bore hole. Similarly the hole for diametral stud 13 does not open to the axial bore hole 17 so that hydrogen cannot escape from the shaft at this location.

Field Winding Pattern

The manner of reverse connections used in the present invention differ from those in the prior art as will be made clear by reference to FIGS. 2 and 3 of the drawing. The figures show a developed schematic view of the entire field winding with the slot-lying conductors indicated at 35 and the end turn conductors at 36.

In a conventional prior art winding shown in FIG. 2, the winding commences at an inner coil terminating conductors 37 and the inner coils 38 are wound making a number of turns for a pair of slots. The winding proceeds from one pair of slots to the next until the outer coils 40 are complete. A connector 41 from one pole to the next is made between outer coils and the winding proceeds from outer coils 42 to inner coils 43, terminating at 44. By means of suitable leads, connections are made from terminals 37, 44 to two or more radial studs 45, 46 attached to semicircular connection bars 47, 48 in the rotor bore hole.

Reference to FIG. 3 will illustrate the reverse manner of connection used in the present invention, the reference numerals corresponding to those seen in FIG. 1. Since the figure is merely schematic, the number of slot conductors per pole is simply indicated to be less than those of the conventional winding. It is intended to illustrate that there be only one, or at the most two, conductors per coil. Reference to FIG. 3 illustrates that the connections from terminal studs 21 are led to the outer turn conductors terminating 10, 12 rather than to the inner turns as in the prior art. The connection between the inner turn terminating conductors 9, 11 is made via the diametral connector 13 as indicated schematically, rather than using a pole-to-pole connector via the outer coils as in the prior art.

Referring now to FIGS. 4 and 8 of the drawing, one preferred construction of the slot-lying conductors 3 is shown for a rotor employing one conductor per slot extending radially to substantially the outer magnetic radius of the rotor forging. The rotor body 1 is machined to provide generally U-shaped longitudinally extending slots 50 with circumferentially extending retaining lips 51. Conductors 3 are formed as monolithic members, either fabricated to provide internal cooling passages (not shown) or from single piece bars with a U-shaped inner section 52, and a narrowed portion 53. Conductors 3 are insulated from rotor body 1 by means of slot armor 55, tooth tip armor members 56, and insulating creepage block members 57. Tooth tip armor members 56 are bonded to the magnetic tooth tips with suitable high strength resin. Slot armor 55, and particularly tooth tip armor members 56 and creepage blocks 57 are selected from insulating materials suitable to withstand the high stresses imposed by conductors 3 as the rotor rotates. Since the voltage of the very high current rotor will be relatively low, typically in the order of 50 volts, the primary criterion to selecting these insulation materials is strength and abrasion resistance polyimide materials impregnated with solid, insulating lubricant materials such as molybdenum disulfide or teflon are among the suitable candidates. The insulating arrangements shown are for conceptual illustration only and other detailed arrangements may be used. For example, the tooth tip armor members may be extended radially inward for some distance and overlapped with slot armor members 55 in suitable recesses provided in conductors 3 or in the rotor teeth. This may allow creepage blocks 57 to be eliminated.

A modified form of the slot conductors is shown in FIG. 5. Here two conductors per slot are employed. Each slot contains mating halves 66, 67 of a conductor similar to the shape shown in FIG. 4. After the two halves are inserted, a separating insulating strip 68 is wedged between the members and held with insulating wedge 59.

Figure 6:
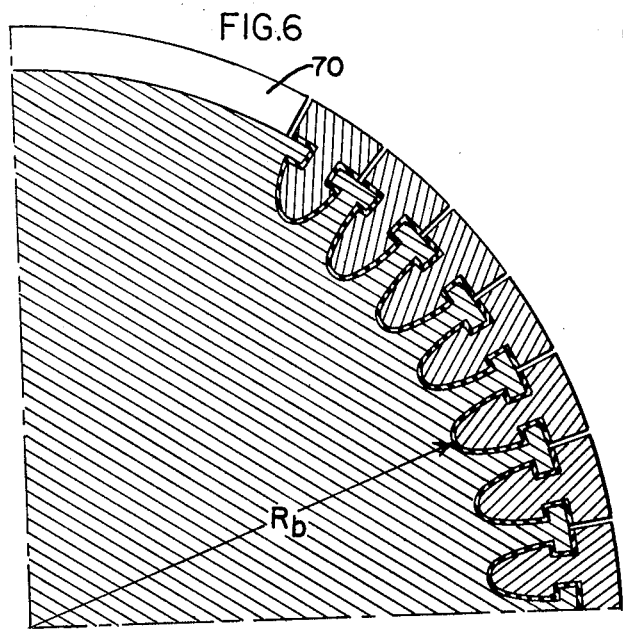
Figure 7:
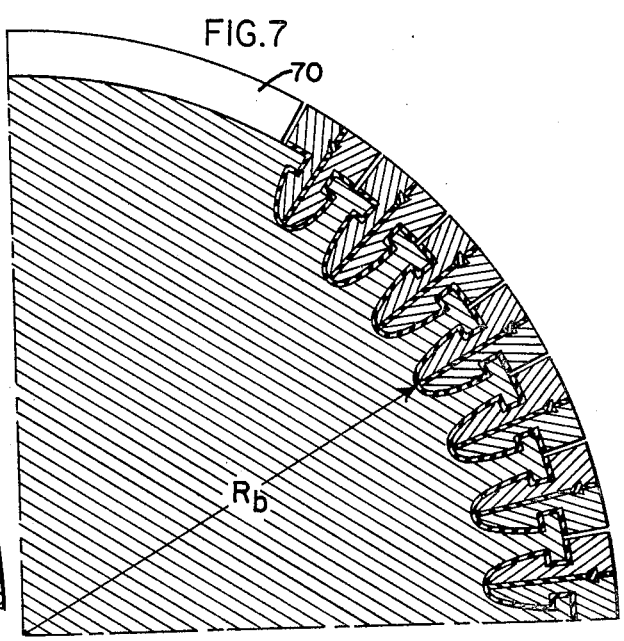

FIGS. 6 and 7 show modifications analogous to FIGS. 5 and 6 (one conductor per slot or two conductors per slot, respectively, are used) except that conductors 3 extend substantially outward beyond the outer magnetic radius of the rotor. Non-magnetic filler members 70 are attached to the pole area of the rotor forging 1 to minimize windage by means of radial bolts (not shown) or circumferential dovetails (not shown).

It will be noted in all the foregoing arrangements, FIGS. 4–8, that slot closing wedges radially outside the rotor winding conductors 3 are not employed, providing substantially more copper conductor area in the total winding cross section compared to the usual arrangements for slots of a given depth. Alternately if the same total copper cross section is provided in the winding, the radius, $R_b$, to the bottom of the rotor slots can be increased providing greater area in the rotor body itself to carry magnetic flux. When the conductors extend radially beyond the outside radius of the magnetic forging as in FIGS. 6 and 7, these opportunities are amplified.

Secondly, it should be noted that in each case all the conductors occupy identical radial positions and stand "edgewise" rather than being stacked radially one on another in the rotor slots. This facilitates locking the conductors in radial position by means of insulated retaining members rather than by use of conventional slot wedges which occupy space and necessarily depress the conductors radially in the slots.

Thirdly, it will be noted that in all cases, FIGS. 4–8, the radial outward faces of the conductors are directly exposed to gas which fills the gap between the rotor and stator. Powerful cooling of the conductors can be affected by rotation of the rotor, both by direct convection from these exposed surfaces or by providing internal passages of the gap pickup variety within the conductors themselves.

Finally, it will be noted that because only one or two (conceivably three) conductors per slot can be used the number of field turns per pole will necessarily be lower than for a conventional winding. Therefore, for the same or an increased ampere-turn product, the field current must be higher than usual (although the current density can be substantially the same), necessitating improved arrangements for leads and connections which constitute a mating part of the invention.

Operation of the Invention

The operation of the invention is as follows.

The very high currents carried through the bore hole connection bars are split into parallel branches by the relatively large number of terminal studs 20, 21 and leads 22. In this manner, the current densities in the studs are not excessive and cooling by means of self-pumping of gas through the passages can be accomplished. Cooling passages through the terminal studs are self-contained therein so there is no risk of hydrogen leakage from this source into the bore hole. Separate coolant streams fed from the end of the shaft, cool the bore hole conductors so that cooling passages do not pass through the electrical joint to the terminal studs thereby risking hydrogen leakage. By connecting the terminal studs to the outermost conductor encircling each pole, space is provided for the requisite number of terminal studs and leads to carry the high current. The connection between poles is made by means of the connector 13 which can be of relatively large cross section, thereby holding the current density to reasonable levels. Effective cooling is accomplished by means of the counterflow passages if a diametral stud connector is employed, or by equivalent ventilation means if other connection arrangements at this point are employed.

Cooling of the slot conductors shown in FIGS. 4–8 is made more effective by means of the exposed portions at the rotor surface providing significant cooling by convection from gas in the gap as the rotor turns. The larger peripheral areas of the conductors that are exposed when the conductors are extended beyond the magnetic diameter of the rotor, FIGS. 6–7, make heat removal by this mechanism even more effective.

In addition, cooling of the slot conductors can be augmented by any of the well known means of internal ventilation. Gap pickup ventilation will be particularly effective if the usual flow passages, scoops and discharge geometries are provided because the internal gas paths will be contained within the conductors over 100% of their length, providing more internal surface area for heat transfer.

Slot retaining wedges and their associated creepage blocks requiring a large amount of parasitic cross-sectional area are not required, providing substantially more space in the rotor cross section for useful purposes. If the radius to the base of the rotor slots (see $R_b$ dimension in FIGS. 4 and 6) is not increased relative to its value for a conventional field winding, then the rotor will be able to pass the same amount of main field flux, but the useful cross-sectional area for the winding will be substantially increased (by 25–30% if the conductors extend only to the magnetic surface, FIGS. 4–5 and by a great deal more if they extend radially beyond the magnetic surface). The rotor ohmic losses for a given rateup are inversely proportional to the total cross-sectional area of conductors per rotor pole, and directly proportional to the square of the rotor rateup (ampere-turns). Consequently, for this case if no more than the same cooling intensity as in the rotor with a conventional winding is achieved, the rotor capability can be increased by about the square root of the increased area ratio.

Alternately the radius, $R_b$, to the bottom of the rotor slots can be increased, obtaining greater generator output in total or in part because of increased main field flux. Those skilled in the art will recognize that radius $R_b$ as shown in the embodiments depicted by FIGS. 4 and 5 is greater than would ordinarily be used for a generator with conventional type rotor windings. Furthermore, if the conductors are designed to extend above the slots as in FIGS. 6 and 7, radius $R_b$ can be made even greater, as shown, while still increasing the area of conductors. While there has been described in the foregoing specification what is considered to be the preferred embodiment of the invention, other modifications will occur to those skilled in the art; and, it is intended to cover in the appended claims all such modifications as fall within the true spirit and scope of the invention.

What is claimed is:

1. A field winding for a two pole dynamoelectric machine rotor of the type having a body portion formed with axially extending insulated slots and a reduced spindle portion at either end thereof comprising:
   a. at least one electrical conductor bar disposed in each axially extending rotor body insulated slot; each slot defined by a pair of radially extending arms and each arm terminating in an enlarged retaining lip portion; each electrical conductor extending radially outward from within its respective slot approximately to the rotor surface;
   b. an inner coil terminating conductor for each rotor pole;
   c. an outer coil terminating conductor for each rotor pole; said inner and outer coil terminating conductors electrically connected to said rotor body conductor bars;
   d. a pole to pole connector electrically connecting said inner coil terminating conductors;
   e. a plurality of terminal studs connected to a negative and positive source of excitation current; and,
   f. a plurality of electrical leads connecting the terminal studs to outer coil terminations, said terminal studs and said electrical leads each are arranged with communicating internal cooling passages and having a coolant inlet on each terminal stud disposed closer to the rotor spindle than a coolant outlet from said lead.

2. The rotor winding according to claim 1, wherein said pole-to-pole connector comprises a diametral stud member extending through said spindle from one side to the other and having cooling passages arranged to circulate gas coolant through said member.

3. The rotor winding according to claim 2, wherein said gas cooling passages comprise at least two parallel channels through the diametral stud member, each arranged with an inlet closer to the rotor spindle than its outlet to provide a self-pumping coolant counterflow.

4. The rotor winding according to claim 1, wherein said terminal studs are arranged in at least two circumferential rings around the spindle and axially offset from one another.

5. The rotor winding recited in claim 1 wherein each slot lying electrical conductor extends radially outward beyond the rotor surface and terminates in an enlarged flange portion beyond the rotor slot retaining lips.

6. The rotor winding recited in claim 1 wherein each slot lying electrical conductor comprises two mating halves electrically insulated from one another and each occupying the same radial position at a given axial position.

* * * * *